United States Patent [19]
Shiffler et al.

[11] Patent Number: 5,415,201
[45] Date of Patent: May 16, 1995

[54] MULTI-STAGE FLUID FLOW CONTROL DEVICE

[75] Inventors: Mark E. Shiffler, Annapolis; Joseph H. Morris, Queenstown, both of Md.

[73] Assignee: The United States of America as represented by the Secretary of the Navy, Washington, D.C.

[21] Appl. No.: 266,078

[22] Filed: Jun. 27, 1994

[51] Int. Cl.6 ................................. F16K 13/00
[52] U.S. Cl. .................. 137/614.11; 138/46; 251/334; 251/902
[58] Field of Search ............. 137/614.11; 138/46; 251/321, 334, 902

[56] References Cited
U.S. PATENT DOCUMENTS

| | | | |
|---|---|---|---|
| 1,654,516 | 12/1927 | Wilson | 251/334 |
| 3,327,993 | 6/1967 | Elchyshyn | 251/334 |
| 3,717,178 | 2/1973 | Allen | 251/902 X |
| 3,896,834 | 7/1975 | Paul | 251/902 X |
| 4,531,450 | 7/1985 | Yamada | |
| 4,655,690 | 4/1987 | Boedecker | |
| 4,852,675 | 8/1989 | Wang | |

Primary Examiner—Robert G. Nilson
Attorney, Agent, or Firm—Charles D. Miller

[57] ABSTRACT

A fluid flow control device includes a support brace fixably mounted in a fluid flow tube. An actuator rod is slidably supported by the support brace. A plurality of conical washers are mounted in sliding engagement on the rod between a stop mechanism on the rod and the support brace. The conical washers are arranged along the rod in an abutting configuration such that adjacent conical washers abut alternately at an apex or base of the conical washers. In operation, the rod is moved so that a compressive force is applied to the conical washers. In this way, the conical washers expand in a radial fashion to reduce the fluid flow area between the device and the tube.

15 Claims, 5 Drawing Sheets

MULTI-STAGE FLUID FLOW CONTROL DEVICE

The invention described herein may be manufactured and used by or for the Government of the United States of America for governmental purposes without payment of any royalties thereon or therefor.

FIELD OF THE INVENTION

The invention relates generally to fluid flow control and valve mechanics, and more particularly to a fluid flow control device that reduces cavitation and associated noise while controlling fluid flow.

BACKGROUND OF THE INVENTION

Most fluid flow control valves consist of a machined seat cooperating with a movable element in the form of a plug, needle, globe, ball or other geometrical shape. When the movable element is in contact with the seat, fluid flow is inhibited. When the movable element is moved away from the seat, a fluid flow area is formed. Where quiet flow control is required, the flow area includes additional flow control elements. These elements typically incorporate multiple orifices or small flow control passages in order to gradually reduce the pressure of the fluid flow such that flow separation and cavitation can be reduced or avoided. However, fluid contaminants often clog the orifices or passages necessitating costly repair.

SUMMARY OF THE INVENTION

Accordingly, it is an object of the present invention to provide a fluid flow control device that reduces cavitation and noise.

Another object of the present invention is to provide a fluid flow control device that is simple to manufacture and service.

Still another object of the present invention is to provide a fluid flow control device that is not subject to clogging by most fluid contaminants.

Other objects and advantages of the present invention will become more obvious hereinafter in the specification and drawings.

In accordance with the present invention, a fluid flow control device is provided. The device includes a support brace fixably mounted in a fluid flow tube. An actuator rod is slidably supported by the support brace so that the rod's longitudinal axis extends substantially along the direction of fluid flow in the tube. The rod includes a stop mechanism extending radially therefrom on one side of the support brace. A plurality of conical washers are mounted in sliding engagement on the rod between the stop mechanism and the support brace. The conical washers are arranged along the rod in an abutting configuration such that adjacent conical washers abut alternately at one of the adjacent washers' apex or base. In operation, the rod is moved so that a compressive force is applied to the conical washers between the stop mechanism and the support brace such that each of the conical washers expands in a radial fashion thereby reducing the fluid flow area around the device.

DETAILED DESCRIPTION OF THE INVENTION

Figure 1:
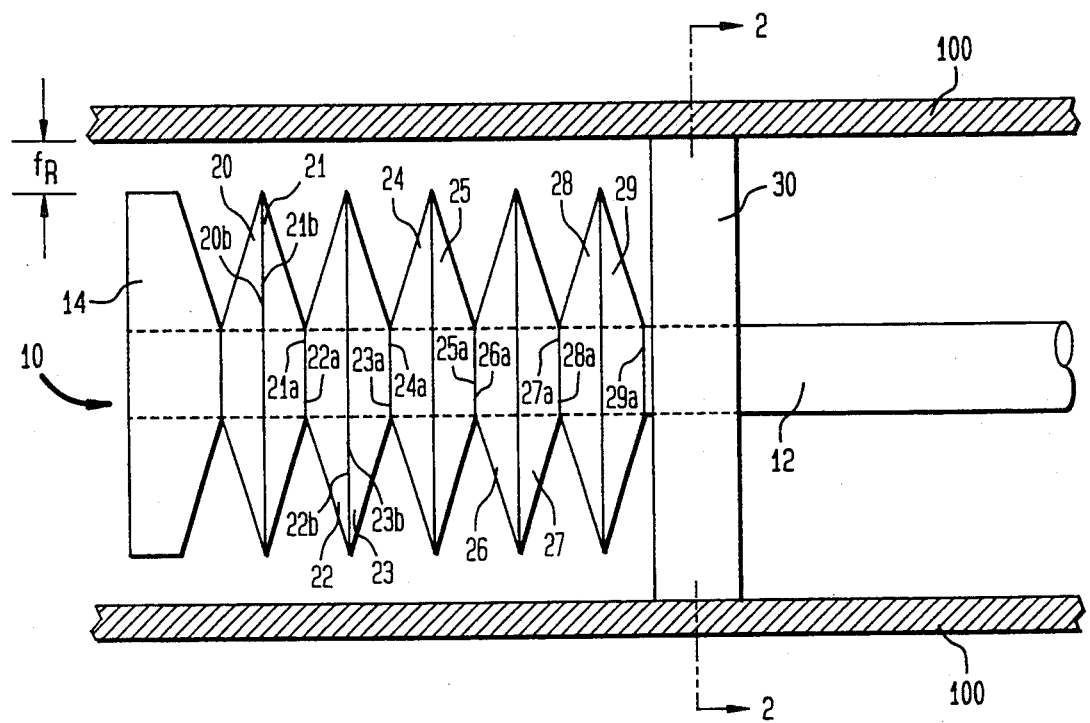
FIG. 1 is a side elevational view of a preferred embodiment multi-stage fluid flow control device in its relaxed state in a fluid flow tube.

Referring now to the drawings, and more particularly to FIG. 1, a side elevational view is shown of a preferred embodiment flow control device, referenced generally by the numeral 10. Device 10 is installed in fluid flow constraining tube 100 which is shown in cross-section. Device 10 is shown in FIG. 1 is in its relaxed or fully open state.

Device 10 consists of actuator rod 12 passing through and supporting a plurality of conical washers 20–29. While ten washers are shown in the embodiment of FIG. 1, more or less washers can be used as needed. Rod 12 is supported in a central portion of tube 100 by cross or support brace 30. Rod 12 terminates in stop 14 extending radially from rod 12. Stop 14 can be integral with rod 12, or fixedly attached to rod 12 by a variety of conventional attachment means, e.g., threaded engagement, welded, peened, pinned, etc. In the simplest embodiment of the present invention, stop 14 need only be large enough to restrain conical washers 20–29 on rod 12. However, as will be explained further below, stop 14 can be sized/shaped to accommodate other device functions.

Figure 2:
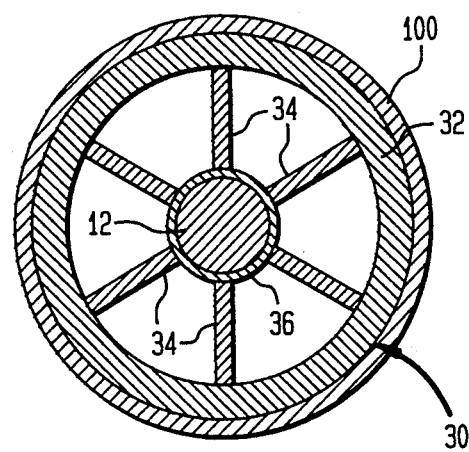
FIG. 2 is a cross-sectional view of the support brace taken along line 2—2 of FIG. 1.

Support brace 30 can be any one of a variety of designs that: 1) permits fluid to flow therethrough, 2) supports rod 12 in a central portion of tube 100, and 3) permits axial movement of rod 12. By way of example one such support brace is of "wagon-wheel" construction as shown in FIG. 2 which depicts a cross-sectional view of support brace 30 taken along line 2–2 of FIG. 1. The outer circumferential portion 32 of support brace 30 is attached (e.g., welded, brazed, etc.) to the inside of tube 100. A plurality radially extending supports 34 connect outer circumferential portion 32 with bearing support 36. Rod 12 passes through bearing support 36 and is capable of axial movement therein. Additional such support braces can be provided as necessary to properly support rod 12. Note that any of the additional support braces interspersed with the conical washers must be able to slide within tube 100.

Figure 3:
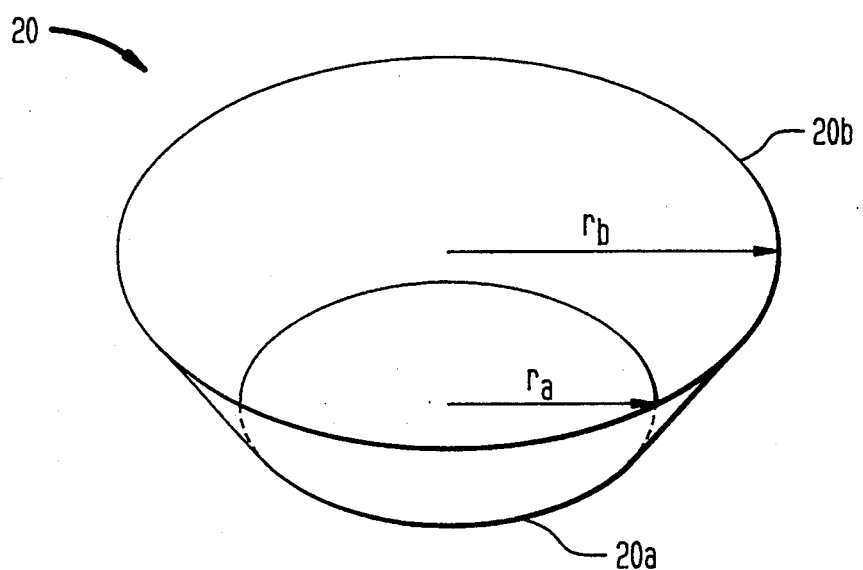
FIG. 3 is a perspective view of a conical washer used in the present invention.

Each conical washer 20–29 can be described with reference to conical washer 20 which is shown in FIG. 3. Conical washer 20 can be a conventional conical washer having its open base portion 20$b$ tapering evenly to its open apex portion 20$a$ such that the radius $r_b$ of open base portion 20$b$ is greater than the radius $r_a$ of open apex portion 20$a$. In the preferred embodiment, conical washer 20 is constructed as a single unit from materials such as spring steel, brass, bronze and copper.

Figure 4:
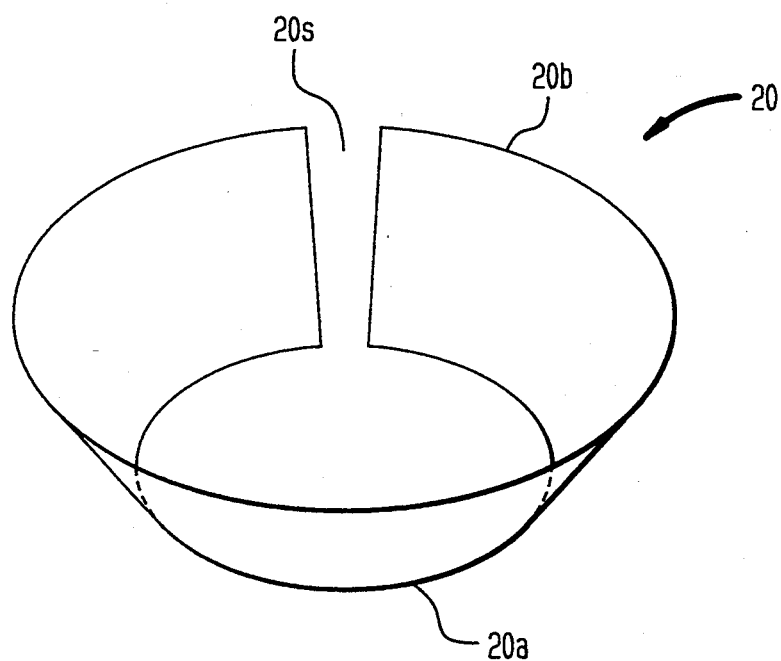
FIG. 4 is a perspective view of an alternative embodiment conical washer.

However, the present invention is not so limited. Some or all of the conical washers used in device 10 could also be of laminate construction (not shown). Alternatively, some or all of the conical washers used in device 10 could be provided with a slot. For example, conical washer 20 could have slot 20s extending between base portion 20b and apex portion 20a as shown in FIG. 4.

Regardless of their individual construction, conical washers 20–29 are arranged on rod 12 on one side of support brace 30 such that adjacent washers about one another in an alternating fashion. That is, base portions 20b and 21b abut, apex portions 21a and 22a abut, base portion 22b and 23b abut, etc. For proper operation and alignment, apex portions 20a–29a are sized to slidably engage rod 12 with tolerances on the order of 0.001–0.002 inches. The circumferential area between the abutting base portions of conical washers 20–29 and tube 100 is defined as the free-flow area $f_R$ when device 10 is in its relaxed state shown in FIG. 1.

Figure 5:
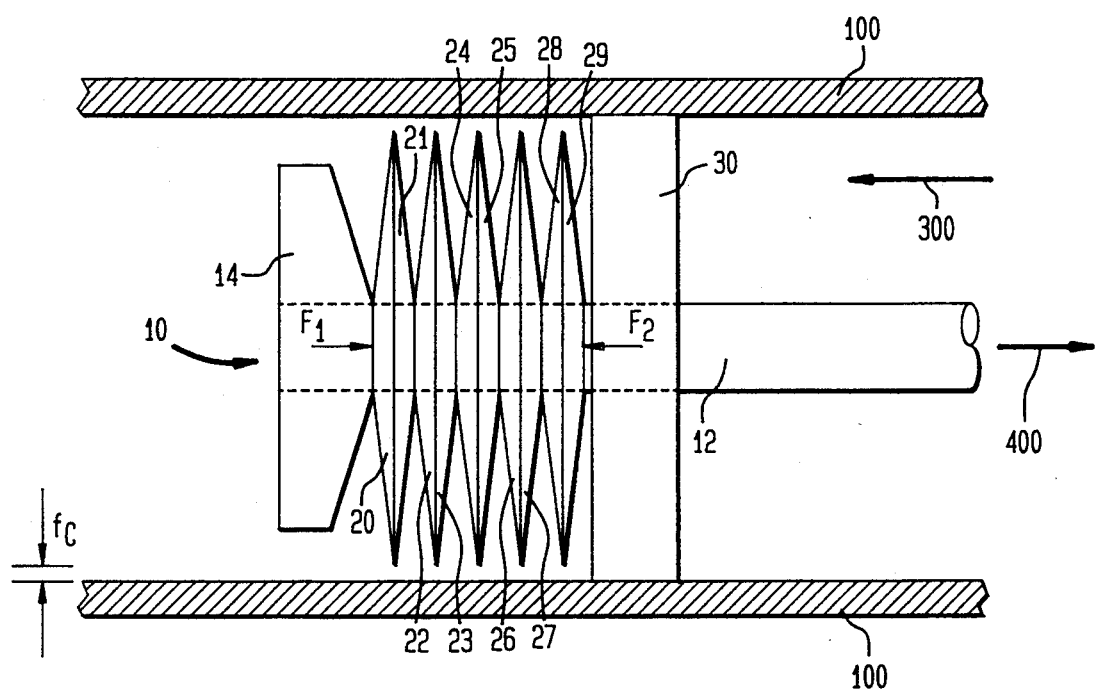
FIG. 5 is a side elevational view of the multi-stage fluid flow control device in which the conical washers have been compressed to reduce the fluid flow area between the fluid flow control device and the fluid flow tube.

In operation, fluid flows through tube 100 in the direction represented by arrow 300 in FIG. 5. When it is desired to control or limit fluid flow 300, rod 12 is moved axially in the direction of arrow 400. As a result, compressive forces $F_1$ and $F_2$ act upon conical washers 20–29 causing compression thereof between stop 14 and support brace 30. As each of the conical washers compresses, each washer's base portion radius increases thereby reducing the fluid free-flow area between device 10 and tube 100 to $f_C$ where $f_C < f_R$. Since the fluid free-flow area is reduced in stages defined by the conical washers, pressure drop across device 10 is achieved in stages. By doing this, the creation and collapse of vapor pockets in the fluid flow (i.e., cavitation) around device 10 is prevented. When rod 12 is moved in the direction opposite that of arrow 400, conical washers 20–29 spring back toward their original size/shape (FIG. 1) thereby increasing the area between device 10 and tube 100.

Figure 6:
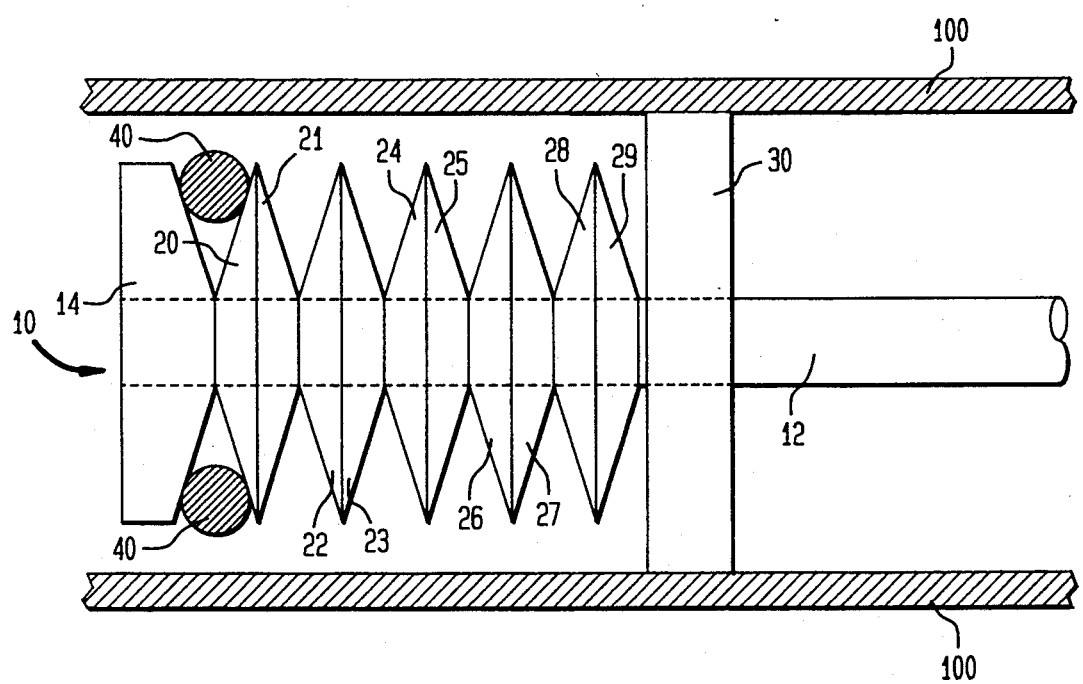
FIG. 6 is an alternative embodiment fluid flow device configured as a sealing valve within the fluid flow tube.

As mentioned above, stop 14 can be sized/shaped to accommodate additional device functions. For example, if device 10 were to act as a sealable valve, a seal material such as elastomeric O-ring 40 could be placed between stop 14 and conical washer 20 as shown in cross-section in FIG. 6. The sizes of O-ring 40, stop 14 and conical washer 20 are selected such that as conical washers 20–29 are compressed, O-ring 40 expands radially to come into sealing engagement with tube 100. Additional O-rings (not shown) could be placed in the annular grooves formed by adjacent pairs of the conical washers whose apex portions abut one another. The additional O-rings could serve as back-up seals to O-ring 40.

Figure 7A:
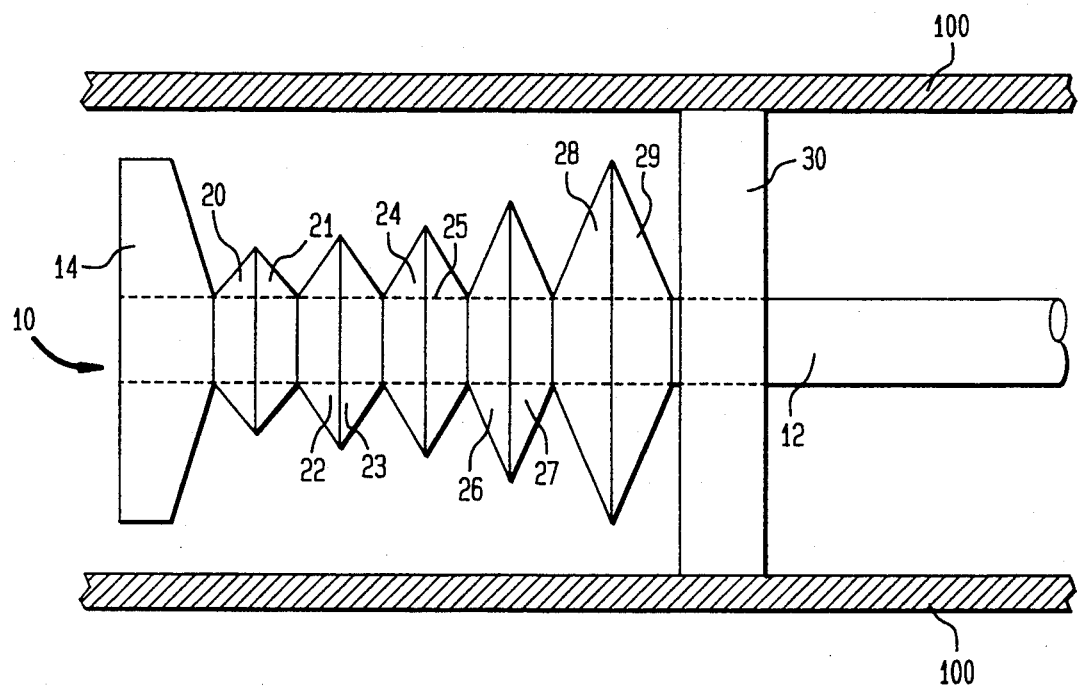
FIG. 7A is alternative conical washer configuration arranged on the actuator rod.
Figure 7B:
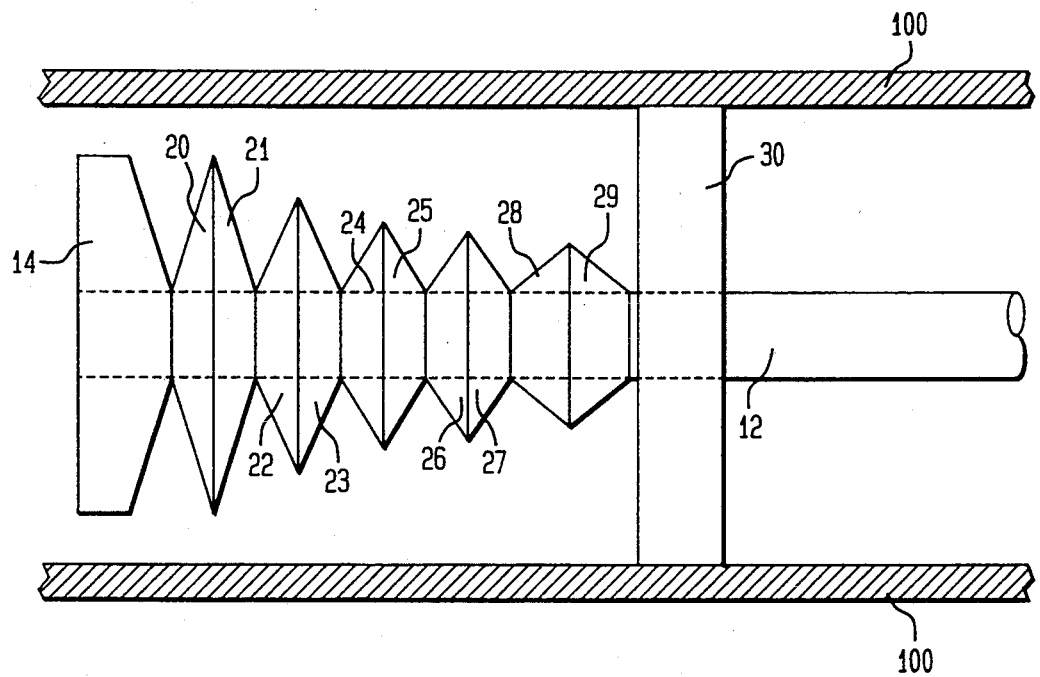
FIG. 7B is another alternative conical washer configuration arranged on the actuator rod.
Figure 7C:
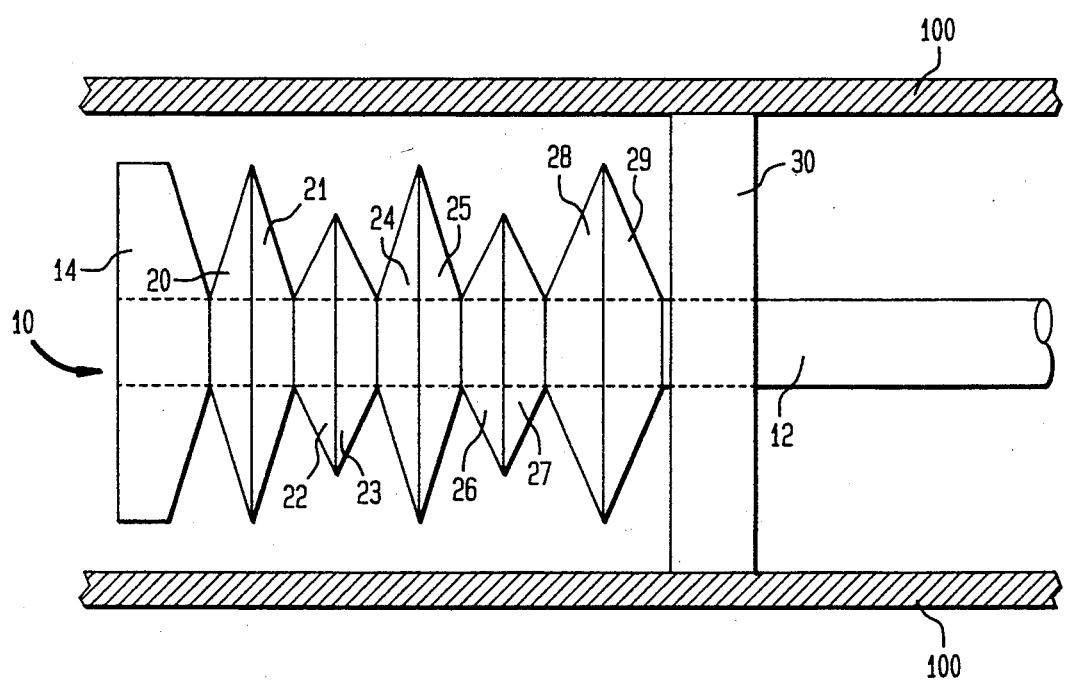
FIG. 7C is yet another alternative conical washer configuration arranged on the actuator rod.

Other alternative embodiments are shown in FIGS. 7A–7C where various sizes and configurations of conical washers 20–29 are shown as they would be mounted on rod 12. Conical washer configurations in the present invention can vary depending on a variety of factors which can include fluid viscosity, response time required of the device, amount of room available for the stroke of the actuator rod, whether the fluid is a liquid or a gas, etc.

In FIGS. 7A and 7B, each conical washer 20–29 has the same apex portion radius $r_a$, and each conical washer pair 20/21, 22/23, 24/25, 26/27 and 28/29 abuts at respective, identically sized base portions. However, in FIG. 7A, adjacent conical washer pairs increase in base portion radius relative to stop 14 while, in FIG. 7B, adjacent conical washer pairs decrease in portion radius relative to stop 14. In the embodiment of FIG. 7C, the base portion radius of conical washer pairs 20/21, 22/23, 24/25, 26/27, and 28/29 increases and decreases in an alternating fashion with each adjacent pair. Obviously, other combinations of washer sizes can be used depending on the type of desired flow control.

The advantages of the present invention are numerous. The flow control device is a simple multi-stage device that can be manufactured and maintained at a minimal cost. Customized quiet flow control can be achieved merely by proper selection and arrangement of conventional conical washers.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A device for controlling fluid flow through a tube, comprising:
    a plurality of conical washers arranged along a common axis in an abutting configuration in which adjacent ones of said plurality of conical washers abut alternately at one of an apex and a base of said adjacent ones;
    means for aligning said plurality of conical washers in said tube along said common axis; and
    means for compressing said plurality of conical washers wherein each of said conical washers expands in a radial fashion.

2. A device as in claim 1 wherein at least one of said plurality of conical washers is capable of expansion in said radial fashion to fully contact said tube when said plurality of conical washers is acted upon by said means for compressing.

3. A device as in claim 1 wherein each of said plurality of conical washers is made from a material selected from the group consisting of spring steel, brass, bronze and copper.

4. A device as in claim 1 wherein at least one of said plurality of conical washers comprises a slotted washer.

5. A device as in claim 1 further comprising resilient seal material seated in an annular groove formed between two of said plurality of conical washers, wherein said seal material expands radially to contact said tube when said plurality of conical washers is acted upon by said means for compressing.

6. A device for controlling fluid flow through a tube, comprising:
    a support brace fixably mounted in said tube;
    a rod having a longitudinal axis, said rod slidably supported by said support brace so that said longitudinal axis extends substantially along a direction of said fluid flow in said tube, said rod including a stop mechanism extending radially from said rod on one side of said support brace; and
    a plurality of conical washers mounted on said rod and in sliding engagement therewith between said stop mechanism and said one end of said support brace, said plurality of conical washers arranged along said rod in an abutting configuration in which adjacent ones of said plurality of conical washers abut alternately at one of an apex and a base of said adjacent ones, wherein each of said plurality of conical washers expands in a radial fashion when said rod is moved so that a compressive force is applied to said plurality of conical washers between said stop mechanism and said one side of said support brace.

7. A device as in claim 6 wherein said stop mechanism is integral with said rod.

8. A device as in claim 6 wherein said stop mechanism is attached to said rod.

9. A device as in claim 6 wherein said support brace centers said rod substantially along a center longitudinal axis of said tube.

10. A device as in claim 6 wherein an inside diameter of each of said plurality of conical washers is the same.

11. A device as in claim 6 wherein an outside diameter of each of said plurality of conical washers is the same.

12. A device as in claim 6 wherein at least one of said plurality of conical washers is capable of expansion in said radial fashion to fully contact said tube when said plurality of conical washers is acted upon by said compressive force.

13. A device as in claim 6 wherein each of said plurality of conical washers is made from a material selected from the group consisting of spring steel, brass, bronze and copper.

14. A device as in claim 6 wherein at least one of said plurality of conical washers comprises a slotted washer.

15. A device as in claim 6 further comprising resilient seal material seated in an annular groove formed between two of said plurality of conical washers, wherein said seal material expands radially to contact said tube when said plurality of conical washers is acted upon by said compressive force.

* * * * *